United States Patent Office 3,424,836
Patented Jan. 28, 1969

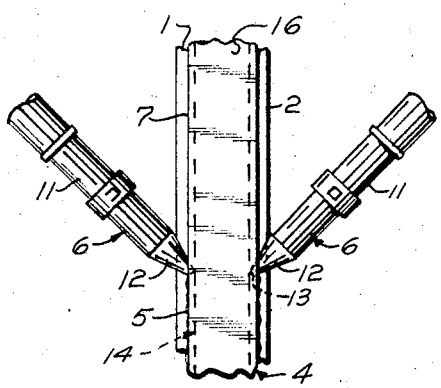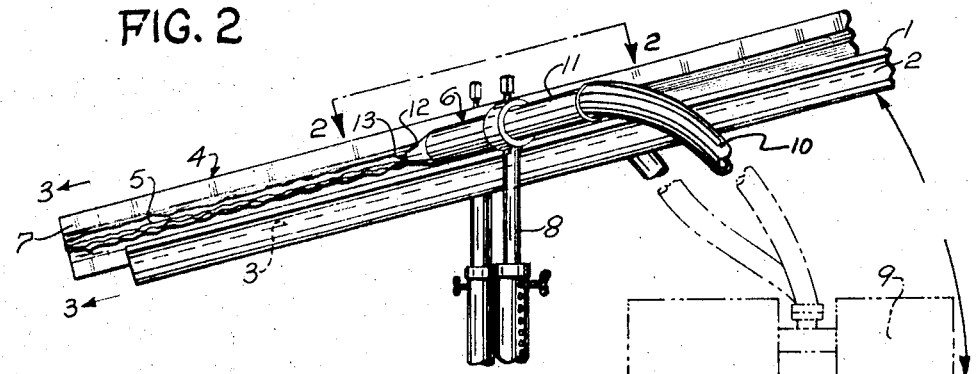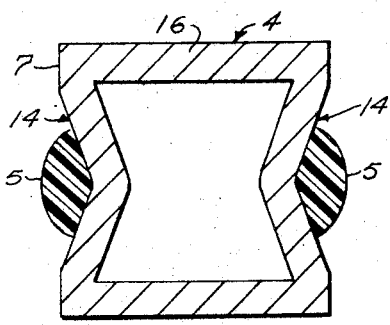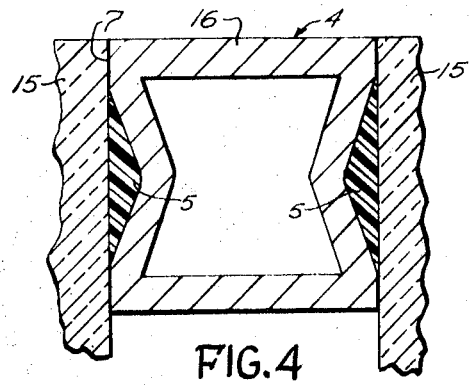

3,424,836
METHOD AND APPARATUS FOR APPLYING A BEAD OF VISCOUS MATERIAL ALONG THE SURFACE OF A MEMBER
Harold E. McKelvey, Plymouth, and Joseph E. Jendrisak, Northville, Mich., assignors to Thermoproof Glass Company, Detroit, Mich., a corporation of Delaware
Filed Sept. 6, 1966, Ser. No. 577,336
U.S. Cl. 264—251                 10 Claims
Int. Cl. B32b 31/30, 1/00

This application relates to methods and apparatus for applying a bead of viscous material with substantially uniform cross-section along the surface of a member as, for example, applying a substantially uniform bead of viscous adhesive to a spacer strip for insulating glass window units.

The present invention provides a method of applying a uniform bead of viscous material to a member whereby the viscous material is extruded against the member with a force sufficient to propel the member past the extruding head. The amount of material applied to a unit length of the member is relatively uniform since the speed of the member is controlled by and directly proportional to the rate of extrusion of the viscous material. When the flow of extruded material slows or accelerates, the receiving member necessarily slows or accelerates proportionally. Correlation of the relative speed of the member and flow of the material is thereby automatic.

In the accompanying drawing, FIGURE 1 is a fragmentary perspective view with portions omitted and shown in phantom of a suitable device for practice of the invention particularly suited for application of viscous adhesives to spacer strips of insulating glass window units. FIGURE 2 is a fragmentary plan view of the device taken along the lines 2—2 of FIGURE 1. FIGURE 3 is an enlarged transverse sectional view of a spacer strip for insulating glass windows prior to assembly in a window unit, but after the adhesive bead has been applied. FIGURE 4 is an enlarged transverse fragmentary sectional view of an insulating glass window unit showing the spacer strip, adhesive bead and glass panels in assembled relation.

Referring in greater detail to the drawings, there is shown in FIGURE 1 suitable apparatus for practice of the invention, and particularly for applying viscous adhesive to spacer strips for insulating window glass units, although it is understood that the present invention contemplates application of other viscous materials to other members intended for other purposes where a uniform bead of viscous material is desired or required. The apparatus shown in FIGURE 1 includes an elongated metal track 1 curved upwardly along its longitudinal edges 2, and supported in an inclined position at about 15° from horizontal by suitable means (not shown). The upper surface 3 of the track 1 may be of any relatively smooth material depending upon the use for which the apparatus is intended, and in the present instance, the metal surface of the track may be satisfactory, although it is usually preferable to treat the upper track surface with an antifriction material such as silicone impregnated paper tape, or one of the fluoroplastics or otherwise to provide a low coefficient of friction between the upper track surface 3 and the supported surface of a particular target member. It is further preferable to provide a track surface which has a coefficient of static friction as near as possible to its coefficient of sliding or kinetic friction which are preferably relatively low, thus enabling the operator to start the target member in motion by merely starting extrusion. Otherwise, it might be necessary for the operator to initiate target member motion by hand to overcome static friction and to prevent undesirable accumulation of the viscous material on the target member at the start of the operation.

The target member 4 (a spacer strip for insulating glass window units) is slidably supported on the upper surface 3 of the track 1 to receive application of a bead of viscous material 5 (polyisobutylene moisture sealant adhesive) from a pair of opposed extrusion heads 6 (better shown in FIGURE 2) positioned adjacent the opposed side surfaces 7 of the target member 4. The extrusion heads 6 are held in position by a pair of adjustable brackets 8 and coupled to means 9 for supplying heated adhesive to the heads 6 under pressure through lead hoses 10.

Extrusion heads 6 for the present invention may be made of any suitable material, including metal and glass. As illustrated, the heads 6 have generally cylindrical body portions 11 and frusto-conical tips 12 provided with circular outlets 13. Adhesive 5 is extruded from the heads 6 obliquely against the side surfaces 7 of the spacer member 4 generally in a direction toward the lower end of the inclined track 1. The angle of the extruding direction relative to the spacer strip 4 may be adjusted for various other applications of the present invention. The outlet 13 of each extrusion head 6 is positioned a minimal distance from the target side surfaces 7 of the spacer member 4 so that maximum pressure from the extruded material 5 is imparted to the spacer member 1. Although frusto-conical tips 12 are shown only with circular outlets 13, the present invention contemplates other outlet 13 configurations including oval, rectangular, half round, square, striated, etc. Thus, the present invention contemplates application of beads having a variety of cross-sectional configurations.

The spacer strip 4 is preferably provided with a longitudinal groove 14 along its target side surfaces 7 to receive the adhesive 5, as best shown in FIGURE 3. The frusto-conical tip 12 of an extrusion head 6 locates in this groove 14 and serves as a guide portion to position the strip 4 and head 6 in proper relative alignment. The groove 14 further serves to hold the adhesive to provide a neat and evenly fitting juncture between the spacer strip 4 and glass panels 15 in the assembled insulating glass window unit, as shown in FIGURE 4.

It is understood that the present invention contemplates a greater or lesser number of extrusion heads for various purposes. For example, a single extrusion head 6 could be positioned adjacent the upper surface 16 of the target member 4 and a single strip of viscous material applied thereto. In another embodiment, for example, two pairs of extrusion heads 6 could be provided, one pair adjacent each of the opposed side surfaces of the target member so that a pair of parallel viscous material strips could be applied along each side surface.

It is further understood that support could be provided by other means than by a slide track. For example, the target member could be supported upon a system of rollers or other support means which would also be within the contemplation of the present invention.

It should be noted here that the present invention is limited to utilization of the extrusion force of the viscous material to provide the principal driving force in that it is the extrusion force which is utilized to correlate target member speed to the rate of extrusion of the viscous material. Because of the difficulty of extruding viscous materials at a constant rate, the extrusion force must be considered to be a variable force. This force is directly proportional to the amount of material extruded and thus, by utilizing the extrusion force as the principal driving force, we are able to obtain the desired uniform application. In some embodiments of the present invention, the extrusion force may in fact provide the only driving force to the target member. The target member should, for best operation, be of light weight material. The target, therefore, has little inertia and is capable of positive and negative acceleration to accommodate changes in delivery of the viscous material thereto. In other cases, secondary driving forces may be required as, for example, where the target member is relatively heavy. By "secondary driving forces," we mean driving forces other than the extrusion force which are relatively contsant. Secondary driving forces may be provided by gravity (for example, where the supporting track is inclined downwardly in the extruding direction). A third class of forces also enters into the operation of the present invention, which class we call "retarding forces." Included here are forces such as are created by kinetic friction, gravity (for example, where the track is inclined upwardly in the extruding direction), and other similar movement of the target member. We generally desingate all forces other than the principal driving force as "secondary forces" for the purposes of the present application, and thus we include both secondary driving forces and retarding forces under the latter heading.

The retarding forces in any particular apparatus for practice of the invention with respect to a particular target member provide a predetermined level of resistance to target member motion. This level of resistance may be lowered by secondary driving forces. For optimum uniformity, the resistance of retarding forces are never overcome altogether by secondary driving forces. Preferably, the target member will start moving when extrusion forces are applied thereto, will move at a speed directly proportional to the rate of extrusion, and will stop when extrusion is stopped. Where a lesser degree of uniformity is required, the secondary driving forces could be employed to move the target member at a constant base speed. In this case, the extrusion force would only act to regulate the target member speed between levels above the base speed.

On the other hand, the secondary forces should be controlled to provide a sufficiently low enough level of resistance to motion of the target member so that the viscous material will not pile up unevenly.

Proper resistance for particular target members is most easily determined by trial and error. Perhaps the simplest method to adjust resistance is by adjusting the inclination of the track or other support means.

In addition, the inclination of the track may be adjusted, within acceptable limits, to regulate the amount of viscous material applied per unit length of material, thereby enabling the operator to obtain beads of greater or lesser cross-section with the same size extrusion head outlet. We prefer inclinations of from 15 to 30° from the horizontal.

A specific example of our invention is an embodiment for applying adhesive to spacer strips for insulating glass window units. A viscous polyisobutylene adhesive, known in the trade as "Tremco 780," is extruded through the outlets of a pair of extrusion heads at a temperature between 150° F. and 200° F. We employ a Lincoln pump to provide a pressure of between 1500 and 2000 p.s.i. We may go as high as 3000 p.s.i., however the requisite pressure is proportional to requisite adhesive temperature and we prefer to work in the higher temperature ranges. The metal extrusion heads have circular outlets of about .0465" diameter. The track 1 is inclined at an angle between about 15° and 30° from horizontal. The spacer strip is hollow aluminum and its cross-section is about $9/32$" square. Adhesive extruded from the die impinges obliquely upon the opposed vertical longitudinal surfaces of the spacer strip at an angle of approximately 45° and generally directed towards the lower end of the track. The force of the extruding adhesive and the resultant force of gravity directed downwardly along the track act to overcome friction forces tending to hold the spacer strip stationary upon the track and the spacer is propelled along the track at a rate directly proportional to the speed with which the adhesive is extruded. As the spacer strip is propelled along the track, the adhesive adheres to the surface of the spacer in a continuous line. "Tremco 780" includes approximately 47 parts by weight of a polyisobutylene elastomer per 100 parts of adhesive and 46 parts by weight of a carbon filler per 100 parts of adhesive. It expands approximately 50% upon leaving the extrusion head evidently causing it to cool and become considerably more viscous. It has a viscosity in the range of $1 \times 10^6$ poises and a Williams plasticity (ASTM D 926) number approximately in the range of 155–225 at 167° F. and a recovery value of 0. We estimate the Mooney viscosity to be between about 40–50 ML–4 at 212° F.

The present invention is primarily applicable to polyisobutylene base adhesives, i.e., those having a continuous phase of high molecular weight (5,000 to 200,000), polyisobutylene, isobutylene copolymer, such as a butyl rubber having a major proportion and preferably at least 90 percent by weight of isobutylene units and a minor proportion of conjugated diolefine or diolefinic compounded such as butadiene and isoprene therein or mixture of such polymers. The isobutylenes homo and/or copolymer may be compounded or stiffened by suitable means such as by incorporation of filler particles such as carbon black, whiting, and/or, highly cross-linked rubbers such as the divinylbenzene cross-linked rubbers, SBR–1009, SBR–1010 to provide a Mooney viscosity, large rotor four minute reading at 212° F. of from about 5 to about 70. If the viscosity of the composition is too high it may be reduced by incorporating therein a compatible nonvolatile polymeric plasticizer such as a polybutene or other polyolefinic compound of from 1000 to 5000 molecular weight to provide a Mooney viscosity of from about 5 to about 70 ML–4 at 212° F. Generally we prefer an adhesive in the viscosity range of from about 30 to about 50 ML–4 at 212° F.

To decrease the moisture and vapor permeability, the pigments used such as the carbon black zinc oxide, etc. may either be treated with a hydroxyl reactive organo silane such as any of the alkenyl or alkyl ethoxy- or methoxy silanes including methyl-, ethyl-, butyl-, or decyltrimethoxy silanes, vinyltri(beta methoxyethoxy)silane or be treated with an organomonoisocyanate or organo diisocyanate such as octylisocyanate, dodecyldiisocyanate, etc. The viscous compound or sealant may also contain a suitable vulcanizing agent, such as an organic peroxide, for example, ditertiary butyl peroxide, and dicumyl peroxide, paradinitrosobenzene or sulfur and suitable accelerators. A room-temperature curing accelerator such as tetramethyl thiuram disulfide is frequently used in the case where a sulfur cure is desirable.

We have found that Tremco 780 is most suitable for insulating glass window units of the commercially available sealants. Although we have not been able to test on this point, the fact that the Tremco adhesive expands significantly upon extrusion (thus evidently cooling and becoming more viscous almost immediately) may be helpful to the operation of the subject invention. The viscous adhesive tends to act somewhat like a pushing rod and provides a relatively firm base against which the less viscous, higher temperature adhesive presses as it leave the extrusion head, thereby facilitating propulsion of the target strip.

In an assembled window unit, spacer strips are disposed between the glass panels along the periphery of their major surfaces so that the adhesive bead forms a vapor seal between the inner major glass surfaces and the spacer strip. In assembly of the window unit, the adhesive bead is pressed against the glass panel and flattened considerably as shown in FIGURE 3. To provide a good vapor seal, it is essential that there be a continuous contact along the edge of the window unit between the spacer strip, the adhesive and the glass. Continuous contact will be achieved only where the adhesive bead has relatively uniform dimensions along the length of the spacer strip prior to assembly of the window unit. In no case may there be substantial differences in the quantity of adhesive at any one particular point which would cause gaps between the adhesive and the glass panels, or which would require the glass panels to be forced together under great pressure to force the adhesive from areas of greater concentration into areas of lesser concentration. Thus, one may see the importance of obtaining a uniform distribution of adhesive along the surfaces of the spacer strip and, accordingly, the importance of the present invention.

Having thus described our invention, we claim:

1. A method of applying a bead of elastomeric viscous material with substantially uniform cross-section to the surface of a member which comprises:
   (a) supporting said member adjacent the outlet of an extrusion head for slidable motion in a linear direction relative to said extrusion head;
   (b) extruding said viscous material through at least two extrusion head outlets obliquely against opposed side surfaces of said member to move said member at a speed directly proportional to the rate of extrusion, the force of extruding said material against said member providing the principal driving force to move said member; and
   (c) guiding said member to maintain each member surface portion receiving said viscous material at a predetermined proximate distance from one of said extrusion outlets.

2. The method of claim 1 and including the further step which comprises adjusting the inclination of suitable supporting means to regulate the quantity of said viscous material applied to a unit length of said member.

3. The method of claim 1 wherein said member is a spacer strip for insulating glass window units, and wherein said viscous material has continuous phase comprising a polymer of isobutylene.

4. The method of claim 1 wherein the member is guided by locating a guide portion of the extrusion head in a groove provided in the member, said groove running substantially parallel to the viscous material receiving portion of said member.

5. A method of applying a bead of polyisobutylene sealant with substantially uniform cross-section to opposed side surfaces of a spacer strip for insulating glass window units which comprises:
   (a) supporting said spacer strip adjacent the outlets of an extrusion head for slidable motion in a linear direction relative to said extrusion heads;
   (b) extruding said adhesive through at least two extrusion head outlets obliquely against opposed side surfaces of said spacer strip to move said spacer strip at a speed directly proportional to the rate of extrusion, the force of extruding said adhesive against said spacer strip providing the principal driving force to move said spacer strip;
   (c) guiding said spacer strip to maintain each spacer strip surface receiving said adhesive at a predetermined proximate distance from one of said extrusion outlets by locating the extrusion outlet bearing portion of each extrusion head in a groove provided in the adhesive receiving portion of said spacer strip; and
   (d) adjusting the resistance to linear movement to regulate the quantity of said adhesive applied to a unit length of said spacer strip.

6. The method of claim 5 wherein said adhesive has a viscosity in the neighborhood of $1 \times 10^6$ poises and has polyisobutylene elastomer and carbon black in major amounts, and including the further step of heating the adhesive to between about 150° and 200° F.

7. The method of claim 5 wherein the inclination of a support for said spacer strip is adjusted to between about 15° and 30° from horizontal, and wherein the adhesive is extruded in a direction generally toward the lower end of said inclined support.

8. Apparatus for applying a bead of viscous material with substastially uniform cross-section to the surface of a member comprising:
   (a) means for movably supporting said member;
   (b) means for imparting movement to said member comprising:
      (i) an extrusion head provided with an extrusion head outlet,
      (ii) means for forcing said viscous material through said outlet obliquely against the surface of said member to move said member at a speed directly proportional to the rate of extrusion, the force of extruding said material against member providing the principal driving force to move said member; and
   (c) means for guiding the member to maintain the member surface portion receiving said viscous material at a predetermined proximate distance from the outlet of said extrusion head.

9. The apparatus for uniform application of viscous materials as recited in claim 8 wherein said support means comprises a track for supporting said member for slidable motion in a linear direction parallel to the member surface portion receiving said viscous material.

10. Apparatus for applying a bead of polyisobutylene adhesive with substantially uniform cross-section to opposed side surfaces of a spacer strip for insulating glass window units which comprises:
   (a) a track for slidably supporting said spacer strip adjacent the outlets of an extrusion head for motion in a linear direction, said track disposed in an inclined position relative to horizontal, the inclination of said track being adjustable, the supporting surface of said track being of an antifriction material;
   (b) means for imparting movement to said spacer strip comprising:
      (i) an extrusion head provided with at least two extrusion head outlets, and wherein at least one of said outlets is disposed adjacent each opposed side surface of said spacer strip,
      (ii) means for forcing said adhesive through said outlets obliquely against said opposed side surfaces of said spacer strip to move said spacer strip at a speed directly proportional to the rate of extrusion, the force of extruding said adhesive against said spacer strip providing the principal driving force to move said spacer strip; and
   (c) means for guiding the spacer strip to maintain the spacer strip surface portion receiving said adhesive at a predetermined proximate distance from the outlets of said extrusion head, including a guide portion disposed on said extrusion head for location in a groove provided in each of the opposed side surfaces of the spacer strip, said groove running substantially parallel to the adhesive receiving portion of said spacer strip.

References Cited

UNITED STATES PATENTS

| | | | |
|---|---|---|---|
| 1,937,104 | 11/1933 | Thomsen | 264—174 |
| 2,137,887 | 11/1938 | Abbott | 156—244 X |
| 2,598,391 | 5/1952 | Jones | 117—105.3 X |
| 2,696,865 | 12/1954 | Seiler | 156—244 X |
| 2,945,390 | 7/1960 | Bush et al. | 264—171 X |
| 3,122,786 | 3/1964 | Huisman | 118—408 X |
| 3,198,655 | 8/1965 | Gisiger | 117—105.3 |
| 3,323,965 | 6/1967 | Hanle et al. | 156—244 |

FOREIGN PATENTS 688,299   6/1964   Canada.

ROBERT F. WHITE, *Primary Examiner.*

N. RUSHEFSKY, *Assistant Examiner.*

U.S. Cl. X.R.

264—174; 118—316, 13; 117—105.3, 161